US008270273B2

(12) United States Patent
Wu

(10) Patent No.: US 8,270,273 B2
(45) Date of Patent: Sep. 18, 2012

(54) CALIBRATION CIRCUIT AND METHOD THEREOF FOR DATA RECOVERY

(75) Inventor: Sheng-Hung Wu, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 28 days.

(21) Appl. No.: 12/571,455

(22) Filed: Oct. 1, 2009

(65) Prior Publication Data

US 2010/0296378 A1 Nov. 25, 2010

(30) Foreign Application Priority Data

May 20, 2009 (TW) .............................. 98116795 A

(51) Int. Cl.
G11B 20/18 (2006.01)
G11B 20/10 (2006.01)
G11B 7/00 (2006.01)

(52) U.S. Cl. ................. 369/53.11; 369/47.28; 369/59.2; 369/44.29; 369/44.27; 369/44.41

(58) Field of Classification Search ............... 369/53.11, 369/47.28, 59.2, 44.29, 44.27, 44.41
See application file for complete search history.

(56) References Cited

U.S. PATENT DOCUMENTS

| 4,571,734 | A | 2/1986 | Dolivo et al. |
| 5,552,942 | A | 9/1996 | Ziperovich et al. |
| 5,956,313 | A | 9/1999 | Maegawa et al. |
| 6,480,447 | B1 | 11/2002 | Wakabayashi et al. |
| 6,496,126 | B2 | 12/2002 | Zhan et al. |
| 6,768,706 | B1 * | 7/2004 | Tonami ...................... 369/47.25 |
| 6,816,547 | B1 | 11/2004 | Kuribayashi |
| 6,934,233 | B2 | 8/2005 | Miyashita et al. |
| 7,142,487 | B2 | 11/2006 | Wu |
| 7,239,583 | B2 * | 7/2007 | Hiratsuka et al. .......... 369/44.41 |
| 7,302,019 | B2 | 11/2007 | Ide |
| 7,663,831 | B2 * | 2/2010 | Hayashi et al. .................. 360/51 |
| 2002/0159350 | A1 * | 10/2002 | Ogura et al. ................ 369/47.35 |
| 2006/0262686 | A1 | 11/2006 | Wu |
| 2009/0185468 | A1 * | 7/2009 | Sakai et al. ................. 369/53.35 |

FOREIGN PATENT DOCUMENTS

| TW | 200908563 | 2/2009 |
| WO | 2006129683 | 12/2006 |

OTHER PUBLICATIONS

"Office Action of Taiwan Counterpart Application", issued on Jun. 21, 2012, p1-p4, in which the listed references were cited.

* cited by examiner

Primary Examiner — Aneeta Yodichkas
(74) Attorney, Agent, or Firm — Jianq Chyun IP Office

(57) ABSTRACT

A calibration circuit and a calibration method thereof for data recovery are provided. The calibration circuit includes an amplitude detector, a period detector, and a compensation circuit. The amplitude detector samples amplitudes of a data signal according to a zero-crossing signal and outputs an amplitude signal accordingly. The period detector counts a clock signal according to the zero-crossing signal and outputs a period signal accordingly. The compensation circuit receives the amplitude signal, the period signal, and the data signal. The compensation circuit adjusts a phase of the data signal by calculating differences between a reference signal and the amplitude signal and between the reference signal and the period signal and outputs a calibrated data signal accordingly. Accordingly, a better recognition performance on the data signal is achieved by calibrating the data signal in real-time.

11 Claims, 10 Drawing Sheets

CALIBRATION CIRCUIT AND METHOD THEREOF FOR DATA RECOVERY

CROSS-REFERENCE TO RELATED APPLICATION

This application claims the priority benefit of Taiwan application serial no. 98116795, filed May 20, 2009. The entirety of the above-mentioned patent application is hereby incorporated by reference herein and made a part of specification.

BACKGROUND OF THE INVENTION

1. Field of Invention

The present invention relates to a calibration circuit and a calibration method for data recovery. More specifically, the present invention relates to a calibration circuit and a calibration method used in an optical storage system for data recovery.

2. Description of Related Art

Common optical storage systems include laser disks, such as compact disks (CDs) and digital versatile disks (DVDs). To reproduce data stored in an optical disk, an optical disc drive (ODD) projects a laser beam onto the surface of the optical disk. The ODD then reads the laser beam reflected from the optical disk. An electric signal generated according to the reflected laser beam is a radio frequency (RF) signal. There are many sources that may cause distortion on a RF signal, such as inter-symbol interference (ISI), electrical delay, scratches on the surface of the disks, aging of the disks, etc. Distortion leads to decrease in the quality of the RF signal and deterioration of recognition performance of the ODD.

Specifically, the ODD converts the reflected laser beam into an electric signal and then processes the electric signal to reproduce the originally stored binary data. In order to obtain reliable binary data, the ODD must accurately detect the phase and the level of the RF signal.

A conventional partial response maximum likelihood (PRML) technology is frequently used to recover the original data from the distorted data. Here, a partial response (PR) method is used to calibrate errors in signal levels to obtain digital data upon which data can be processed. To decode the digital data into the originally stored data, the Viterbi decoding mechanism of the maximum likelihood (ML) can be applied, and error calibration is performed on a bit-by-bit basis. Although the aforementioned PRML technology enhances the reliability of the RF signal, it also greatly complicates the system designs and hardware embodiments. Furthermore, the PMRL technology also consumes a lot of additional system resources.

SUMMARY OF THE INVENTION

Accordingly, the present invention provides a calibration circuit for data recovery. Through analyzing amplitude and period of a data signal and comparing the amplitude and the period with amplitude and period reference values, the calibration circuit can adjust the data signal in real-time. The adjusted data signal would have a better recognition rate. The data signal herein can be a sliced RF signal.

The present invention also provides a calibration method for data recovery. Through analyzing amplitude and period of a data signal and comparing the amplitude and the period with amplitude and period reference values, the calibration method can adjust the data signal in real-time. The adjusted data signal has a favorable recognition rate.

The present invention provides a calibration circuit for data recovery. The calibration circuit includes an amplitude detector, a period detector, and a compensation circuit. The amplitude detector receives a data signal and a zero-crossing signal, samples a plurality of amplitudes of the data signal according to the zero-crossing signal, and outputs an amplitude signal. The period detector receives the zero-crossing signal and the clock signal, samples the clock signal according to the zero-crossing signal, and outputs a period signal. The compensation circuit receives the amplitude signal, the period signal, and the data signal, adjusts a phase of the data signal through calculating differences between the amplitude signal and a reference amplitude signal and between the period signal and, a reference period signal and outputs a calibrated data signal.

According to an embodiment of the present invention, the compensation circuit includes a statistics unit and an adjuster. The statistics unit is coupled to the amplitude detector. The statistics unit predetermines the reference signal, which includes a plurality of amplitude reference values and a plurality of period reference values. The statistics unit selects two of the amplitude reference values closest to the amplitude signal. The statistics unit interpolates a period reference value corresponding to the amplitude signal from the period reference values. The adjuster is coupled to the statistics unit and the period detector. The adjuster receives the period signal and the interpolated period reference value, generates a first compensation parameter accordingly, adjusts the phase of the data signal according to the first compensation parameter, and outputs the calibrated data signal.

According to an embodiment of the present invention, the adjuster includes a calculation unit and a phase adjuster. The calculation unit is coupled to the statistics unit and the period detector. The calculation unit receives the period signal and the interpolated period reference value, calculates a difference value between the period signal and the interpolated period reference value, multiplies the difference value by a predetermined multiplier, and generates the first compensation parameter accordingly. The phase adjuster is coupled to the calculation unit. The phase adjuster adjusts the phase of the data signal through adjusting a starting time and an ending time of the period signal according to the first compensation parameter. The phase adjuster then outputs the calibrated data signal.

According to an embodiment of the present invention, the compensation circuit includes a statistics unit and an adjuster. The statistics unit is coupled to the period detector. The statistics unit predetermines the reference signal that includes a plurality of amplitude reference values and a plurality of period reference values. The statistics unit selects two of the period reference values closest to the period signal. The statistics unit interpolates an amplitude reference value from the amplitude reference values corresponding to the period signal. The adjuster is coupled to the statistics unit and the amplitude detector. The adjuster receives the amplitude signal and the interpolated amplitude reference value, generates a second compensation parameter accordingly, adjusts the phase of the data signal according to the second compensation parameter, and outputs the calibrated data signal.

According to an embodiment of the present invention, the adjuster includes a calculation unit and a phase adjuster. The calculation unit is coupled to the statistics unit and the amplitude detector. The calculation unit receives the amplitude signal and the interpolated amplitude reference value, calculates a difference value between the amplitude signal and the interpolated amplitude reference value, multiples the difference value by a predetermined multiplier, and generates a second compensation parameter accordingly. The phase adjuster is coupled to the calculation unit. The phase adjuster adjusts the phase of the data signal through adjusting a starting time and an ending time of the period signal according to the second compensation parameter and outputs the calibrated data signal.

According to an embodiment of the present invention, the calibration circuit further includes a slicer and a phase lock loop. The slicer receives a RF signal and a slicing level, slices the RF signal according to the slicing level, and outputs the data signal and the zero-crossing signal. The phase lock loop is coupled to the slicer. The phase lock loop receives the data signal and outputs the clock signal accordingly.

According to an embodiment of the present invention, the calibration circuit further includes a bit stream generator. The bit stream generator is coupled to the compensation circuit. The bit stream generator receives the calibrated data signal, converts the calibrated data signal into a bit stream, and then outputs the bit stream.

The present invention provides a calibration method for data recovery. In the calibration method, amplitudes of a data signal are sampled according to a zero-crossing signal to generate an amplitude signal. A clock signal is counted according to the zero-crossing signal to generate a period signal. Then, through calculating differences between a reference signal and the amplitude and the period signals, a phase of the data signal is adjusted to generate a calibrated data signal.

According to an embodiment of the present invention, the step of generating the calibrated data signal includes: providing the reference signal that includes a plurality of amplitude reference values and a plurality of period reference values, selecting from the amplitude reference values two amplitude reference value that are closest to the amplitude signal, and interpolating a period reference value corresponding to the selected amplitude reference value or looking up from the period reference values a period reference value corresponding to the selected amplitude reference value. Next, in the method, the period signal and the interpolated/looked up period reference value are calculated, a first compensation parameter is generated accordingly, and the phase of the data signal is adjusted according to the first compensation parameter to obtain the calibrated data signal.

According to an embodiment of the present invention, the step of generating the first compensation parameter includes calculating a difference value between the period signal and the period reference value obtained through interpolation/table looking up and multiplying the difference value by a predetermined multiplier to generate the first compensation parameter.

According to an embodiment of the present invention, the step of generating the calibrated data signal through adjusting the phase of the data signal according to the first compensation parameter includes adjusting a starting time and an ending time of the period signal according to the first compensation parameter.

According to an embodiment of the present invention, the step of generating the calibrated data signal includes: providing the reference signal that includes a plurality of amplitude reference values and a plurality of period reference values, selecting from the period reference values two period reference values that are closest to the period signal, and interpolating an amplitude reference value corresponding to the selected period reference value or looking up from the amplitude reference values an amplitude reference value corresponding to the selected period reference value. Next, in the method, the amplitude signal and the amplitude reference value obtained through interpolation/table looking up are calculated to generate a second compensation parameter, and then the phase of the data signal is adjusted according to the second compensation parameter to generate the calibrated data signal.

According to an embodiment of the present invention, the step of generating the second compensation parameter includes calculating a difference value between the amplitude signal and the amplitude reference value obtained through interpolation/table looking up and multiplying the difference value by a predetermined multiplier to generate the second compensation parameter.

According to an embodiment of the present invention, the step of generating the calibrated data signal through adjusting the phase of the data signal according to the second compensation parameter includes adjusting a starting time and an ending time of the period signal according to the second compensation parameter.

According to an embodiment of the present invention, the calibration method further includes slicing a RF signal according to a slicing level to obtain the data signal and the zero-crossing signal and generating the clock signal according to the phase of the data signal.

According to an embodiment of the present invention, the calibration method further includes converting the calibrated data signal into a bit stream.

Accordingly, the present invention enhances the reliability and increases the recognition rate of the RF signal. In addition, according to the present invention, the RF signal is adjusted in real-time to diminish the phase and amplitude distortion caused by noise.

In order to make the aforementioned and other features and advantages of the present invention more comprehensible, embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Traditional optical storage systems use the PRML technology to calibrate the RF signal reflected from the surface of an optical disk. However, the PRML technology requires more memory units. This requirement not only increases chip areas but also increases chip manufacturing costs. In addition, the PRML technology complicates the system designs and makes it more difficult to embody the hardware.

Accordingly, in an embodiment of the present invention, an amplitude detector and a period detector are utilized to obtain a plurality of amplitudes and a plurality of periods of a data signal according to a zero-crossing signal and a clock signal. According to the data signal, a slicer and a phase lock loop (PLL) generate the zero-crossing signal and the clock signal, respectively. To adjust the data signal, a compensation circuit compares the amplitudes and the periods and adjusts the phase of the data signal within adjacent zero-crossing points. Since the calibrated data signal has a compensated phase, signal distortion is diminished in the embodiment, and the reliability of the RF signal is enhanced. In addition, according to the present embodiment, complicated hardware designs are not required. The following paragraphs and accompanying figures illustrate some specific embodiments of the present invention. To maintain consistency, two similar functional units having the same function and structure are represented by the same name and the same reference number in different figures.

First Embodiment

Figure 1:
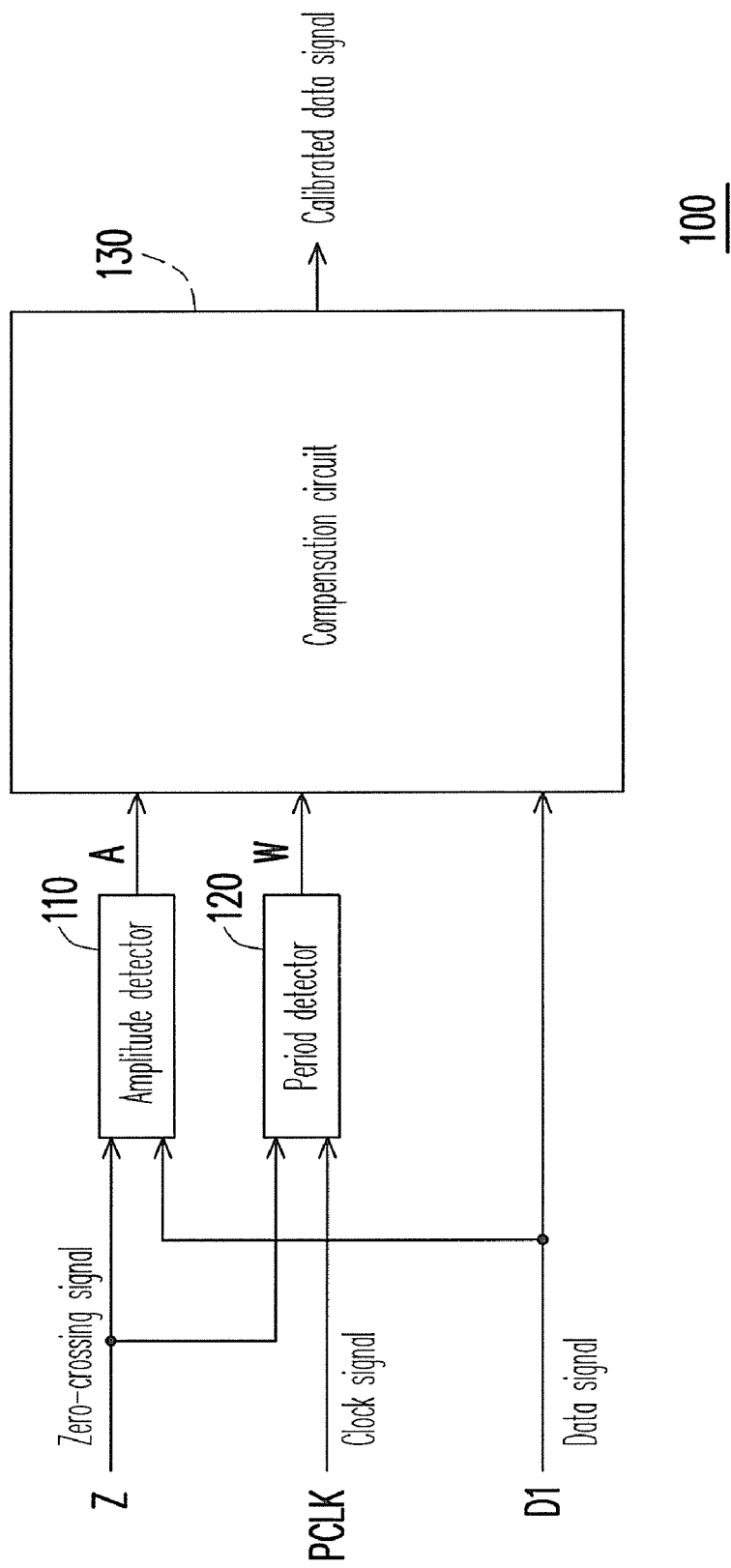
FIG. 1 is a block diagram of a calibration circuit for data recovery according to a first embodiment of the present invention.

FIG. 1 is a block diagram of a calibration circuit 100 for data recovery according to a first embodiment of the present invention. The calibration circuit 100 includes an amplitude detector 110, a period detector 120, and a compensation circuit 130. The compensation circuit 130 is coupled to the amplitude detector 110 and the period detector 120.

The amplitude detector 110 receives a zero-crossing signal Z and a data signal D1. The zero-crossing signal Z is a stream of a plurality of zero-crossing points $Z_{k-2}$, $Z_{k-1}$, $Z_k$, $Z_{k+1}$, $Z_{k+2}$ . . . , and the amplitude detector 110 partitions the data signal D1 into m segments according to the zero-crossing signal Z, where m is a positive integer. The amplitude detector 110 samples the data signal D1. For example, the amplitude detector 110 measures the maximum amplitude of each of the segments to obtain the amplitudes of the m segments of the data signal D1 and outputs an amplitude signal A accordingly. The amplitude signal A is a stream of maximum amplitudes $A_{k-2}$, $A_{k-1}$, $A_k$, $A_{k+1}$, $A_{k+2}$ . . . .

The period detector 120 receives the zero-crossing signal Z and a clock signal PCLK, where the clock signal PCLK is a stream of a plurality of clock intervals. According to the clock signal PCLK, the period detector 120 measures the clock intervals between adjacent zero-crossing points to obtain the period of each of the m segments of the data signal D1. The period detector 120 then outputs a period signal W accordingly. The period signal W is a stream of periods $W_{k-2}$, $W_{k-1}$, $W_k$, $W_{k+1}$, $W_{k+2}$ . . . of the signal segments. For example, according to the zero-crossing signal Z, the period detector 120 counts the clock signal PCLK to obtain the number of clock intervals between the adjacent zero-crossing points. The counted results are then considered as the period signal W.

The compensation circuit 130 receives the amplitude signal and period signal. The compensation circuit 130 calculates the difference between a reference signal and the amplitude $A_k$ and the period $W_k$ of the $k^{th}$ segment, adjusts the phase of the data signal D1, and then outputs the calibrated data signal. Detailed descriptions are provided below together with a flow chart.

Figure 2:
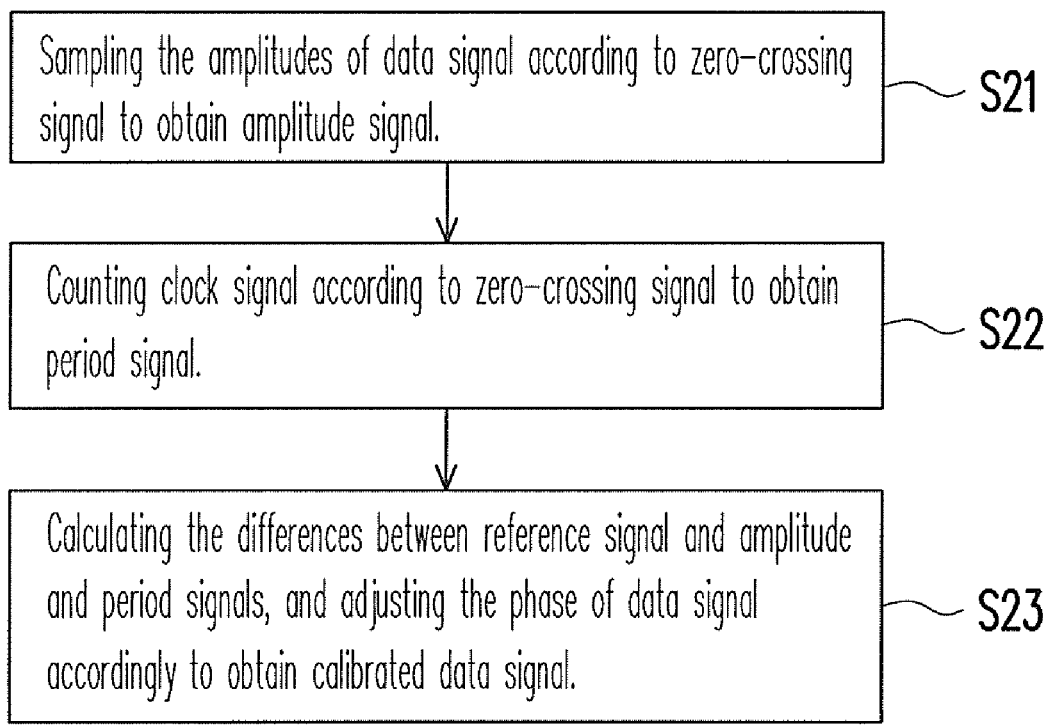
FIG. 2 is a flow chart of a calibration method for data recovery according to the first embodiment of the present invention.

Please refer to both FIG. 1 and FIG. 2. FIG. 2 is a flow chart of a calibration method for data recovery according to the first embodiment of the present invention. First, in step S21, the amplitude detector 110 receives the data signal D1 and the zero-crossing signal Z and samples the data signal D1 according to the zero-crossing signal Z to obtain the amplitude signal. In step S22, the period detector 120 receives the zero-crossing signal Z and the clock signal PCLK, samples the clock signal PCLK according to the zero-crossing signal Z, and outputs the period signal. In step S23, the compensation circuit 130 receives the amplitude signal, the period signal, and the data signal D1, calculates the differences between the reference signal and the amplitude and the period signals, adjusts the phase of the data signal D1 accordingly, and outputs the calibrated data signal.

In this embodiment, the reliability of the data signal and the recognition rate of the data signal are both increased. Additionally, through calibrating the data signal in real-time, phase and amplitude distortion caused by noise is diminished according to the present embodiment.

Second Embodiment

Figure 3:
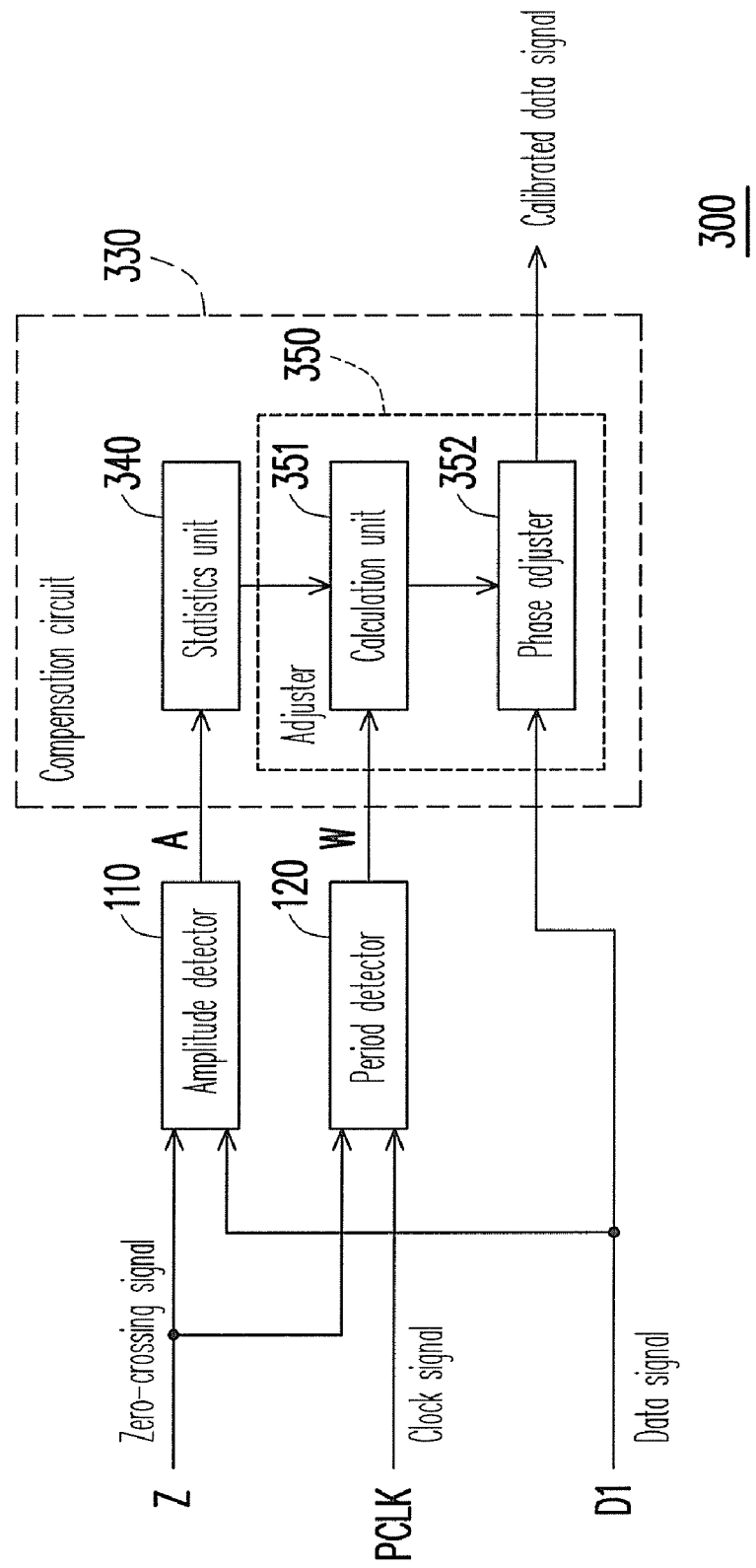
FIG. 3 is a block diagram of a calibration circuit for data recovery according to a second embodiment of the present invention.

FIG. 3 is a block diagram of a calibration circuit 300 for data recovery according to a second embodiment of the present invention. Please refer to both FIGS. 1 and 3. The difference between the second embodiment and the first embodiment mainly lies in a compensation circuit 330.

In this embodiment, the calibration circuit 300 includes an amplitude detector 110, a period detector 120, and a compensation circuit 330. The compensation circuit 330 includes a statistics unit 340 and an adjuster 350. The adjuster 350 further includes a calculation unit 351 and a phase adjuster 352.

In this embodiment, the statistics unit 340 is coupled to the amplitude detector 110. The calculation unit 351 is coupled to the statistics unit 340 and the period detector 120. The phase adjuster 352 is coupled to the calculation unit 351.

The statistics unit 340 has a predetermined (or preset) reference signal. The reference signal indicates the relationship between the amplitude reference values and the period reference values. With the reference signal and an amplitude reference value, the statistics unit 340 can determine a corresponding period reference value. With the reference signal and a period reference value, the statistics unit 340 can determine a corresponding amplitude reference value. In another embodiment, the relationship between the amplitude reference values and the period reference values is represented by a look-up table pre-stored in the statistics unit 340.

In this embodiment, the statistics unit 340 receives the amplitude signal $A_k$ generated by the amplitude detector 110. From the period reference values of the reference signal, the statistics unit 340 selects/interpolates a period reference value $W_k'$ corresponding to the amplitude signal $A_k$. The adjuster 350 receives the period reference value $W_k'$. Specifically, the calculation unit 351 of the adjuster 350 receives the period reference value $W_k'$, receives the period signal $W_k$ generated and output by the period detector 120, and calculates a difference value $W_k - W_k'$ between the period signal $W_k$ and the period reference value $W_k'$. The calculation unit 351 then multiplies the difference value $W_k-W_k'$ by a predetermined multiplier K to generate a first compensation parameter $K(W_k-W_k')$. To adjust the phase of the data signal D1, the phase adjuster 352 adjusts a starting time and an ending time of the period signal according to the first compensation parameter. The phase adjuster 352 then outputs the calibrated data signal.

Figure 4:
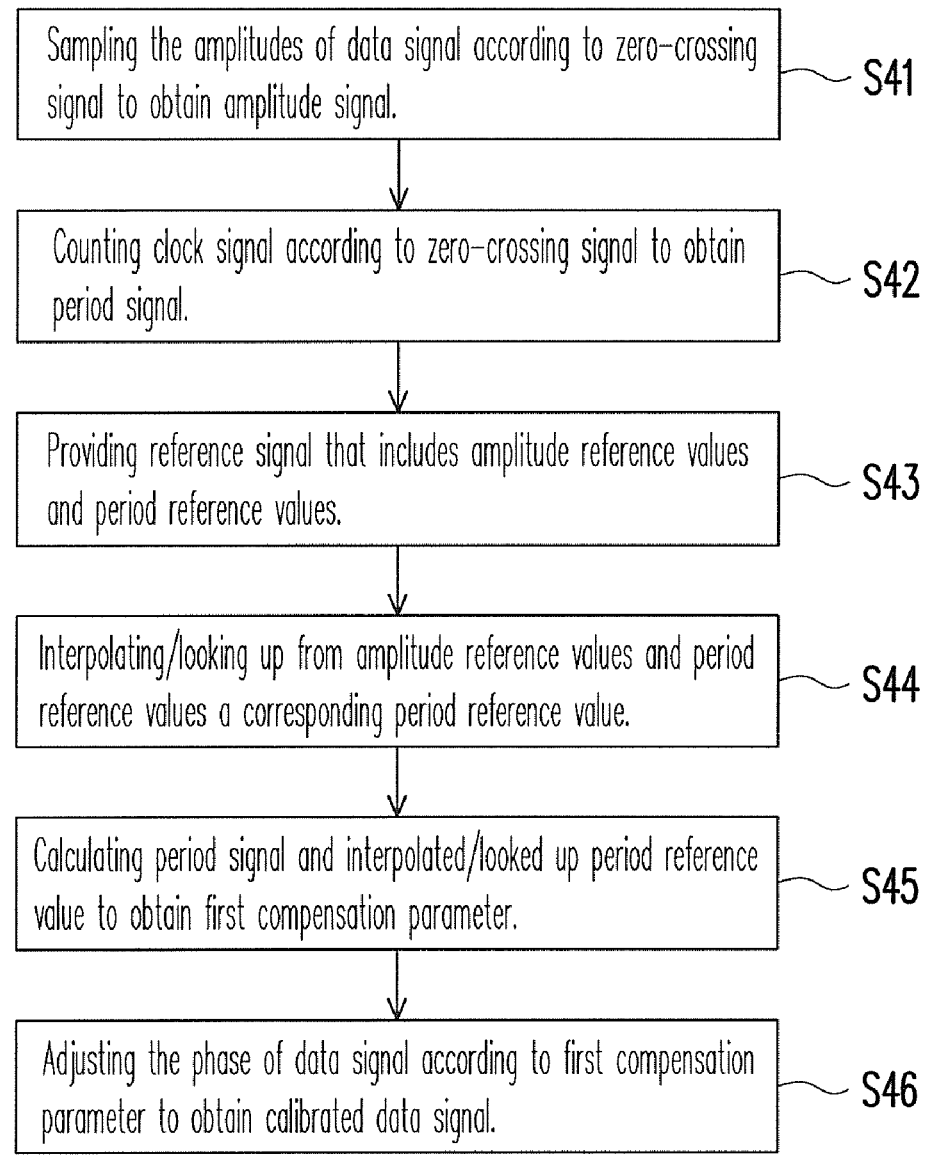
FIG. 4 is a flow chart of a calibration method for data recovery according to the second embodiment of the present invention.

Please refer to both FIG. 3 and FIG. 4. FIG. 4 is a flow chart of a calibration method for data recovery according to the second embodiment of the present invention. In step S41, the amplitude detector 110 receives the data signal D1 and the zero-crossing signal Z, samples the amplitudes of the data signal D1 according to the zero-crossing signal Z, and outputs the amplitude signal $A_k$. In step S42, the period detector 120 receives the zero-crossing signal Z and the clock signal PCLK, samples the clock signal PCLK according to the zero-crossing signal Z, and outputs the period signal $W_k$. In step S43, the statistics unit 340 provides the reference signal that includes a plurality of amplitude reference values and a plurality of period reference values. In step S44, the statistics unit 340 selects/interpolates then outputs a period reference value $W_k'$ corresponding to the amplitude signal $A_k$. In step S45, the calculation unit 351 receives the period signal $W_k$ and the period reference value $W_k'$, calculates a difference value between the period signal $W_k$ and the period reference value $W_k'$, and multiples the difference value by a predetermined multiplier to obtain the first compensation parameter. In step S46, to adjust the phase of the data signal D1 and output the calibrated data signal, the phase adjuster 352 adjusts a starting time and an ending time of the period signal according to the first compensation parameter.

Figure 5:
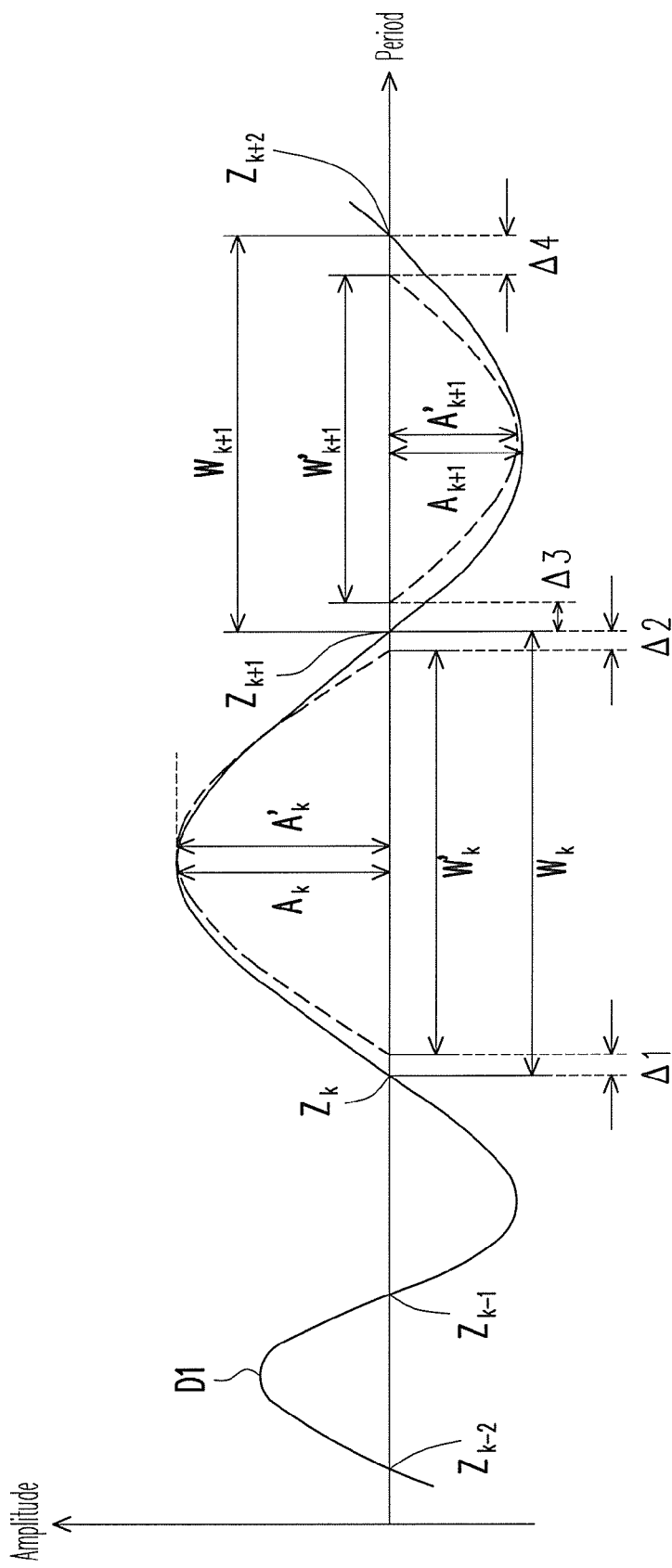
FIG. 5 is a waveform diagram of the calibration method according to the second embodiment of the present invention.

FIG. 5 is an exemplary waveform diagram of the calibration method according to the second embodiment of the present invention. Please refer to both FIGS. 3 and 5. The amplitude detector 110 receives the data signal D1 and the zero-crossing signal Z which is a stream of a plurality of zero-crossing points $Z_{k-2}$, $Z_{k-1}$, $Z_k$, $Z_{k+1}$, and $Z_{k+2}$. The amplitude detector 110 samples the data signal D1 according to the zero-crossing signal Z. The $k^{th}$ segment of the data signal D1 lies between the zero-crossing points $Z_k$ and $Z_{k+1}$. The amplitude detector 110 samples the maximum amplitude $A_k$ of the $k^{th}$ segment of data signal D1 and outputs the sampled amplitude $A_k$ to the statistics unit 340. Based on the predetermined reference signal, the statistics unit 340 selects/interpolates a period reference value $W_k'$ corresponding to the amplitude signal $A_k$. The statistics unit 340 then outputs the period reference value $W_k'$ to the calculation unit 351.

The period detector 120 samples the period $W_k$ of the $k^{th}$ segment of the data signal D1 and outputs the period $W_k$ to the calculation unit 351. The calculation unit 351 receives the period signal $W_k$ and the period reference value $W_k'$, calculates the difference between the period signal $W_k$ and the period reference value $W_k'$, and generates the first compensation parameter C1 according to the following equation (1):

$$C1 = K_1 * (W_k - W_k') \qquad (1)$$

where $K_1$ is a weighting factor. Next, the phase adjuster 352 adjusts the phase of the $k^{th}$ segment of the data signal D1 according to the first compensation parameter C1. Simply speaking, if the period reference value is larger than the measured period, the measured period is relatively short and can be extended accordingly in the embodiment. For example, when the measured period is relatively short, the phase adjuster 352 can advance the starting time of the $k^{th}$ segment of the data signal D1 to reduce a phase error Δ1 according to the first compensation parameter C1. The phase adjuster 352 can also delay the ending time of the $k^{th}$ segment of the data signal D1 to reduce a phase error Δ2 according to the first compensation parameter C1. Namely, the phase adjuster 352 adjusts the period signal $W_k$ of the $k^{th}$ segment of the data signal D1 to let the period signal $W_k$ become closer to the period reference value $W_k'$ and to diminish the phase error(s) of the $k^{th}$ segment of the data signal D1. Similarly, in the present embodiment, by adjusting the $(k+1)^{th}$ segment of the data signal D1, a period reference value $W_{k+1}'$ corresponding to the maximum amplitude $A_{k+1}$ is obtained, the difference between the period signal $W_{k+1}$ and the period reference value $W_{k+1}'$ is calculated, and a phase error Δ3 and a phase error Δ4 are diminished. Thereby, the $(k+1)^{th}$ segment of the data signal D1 can have a reduced error.

Through adjusting the period signal of each segment of the data signal D1, the reliability of the data signal D1 can be improved according to the present embodiment.

Third Embodiment

Figure 6:
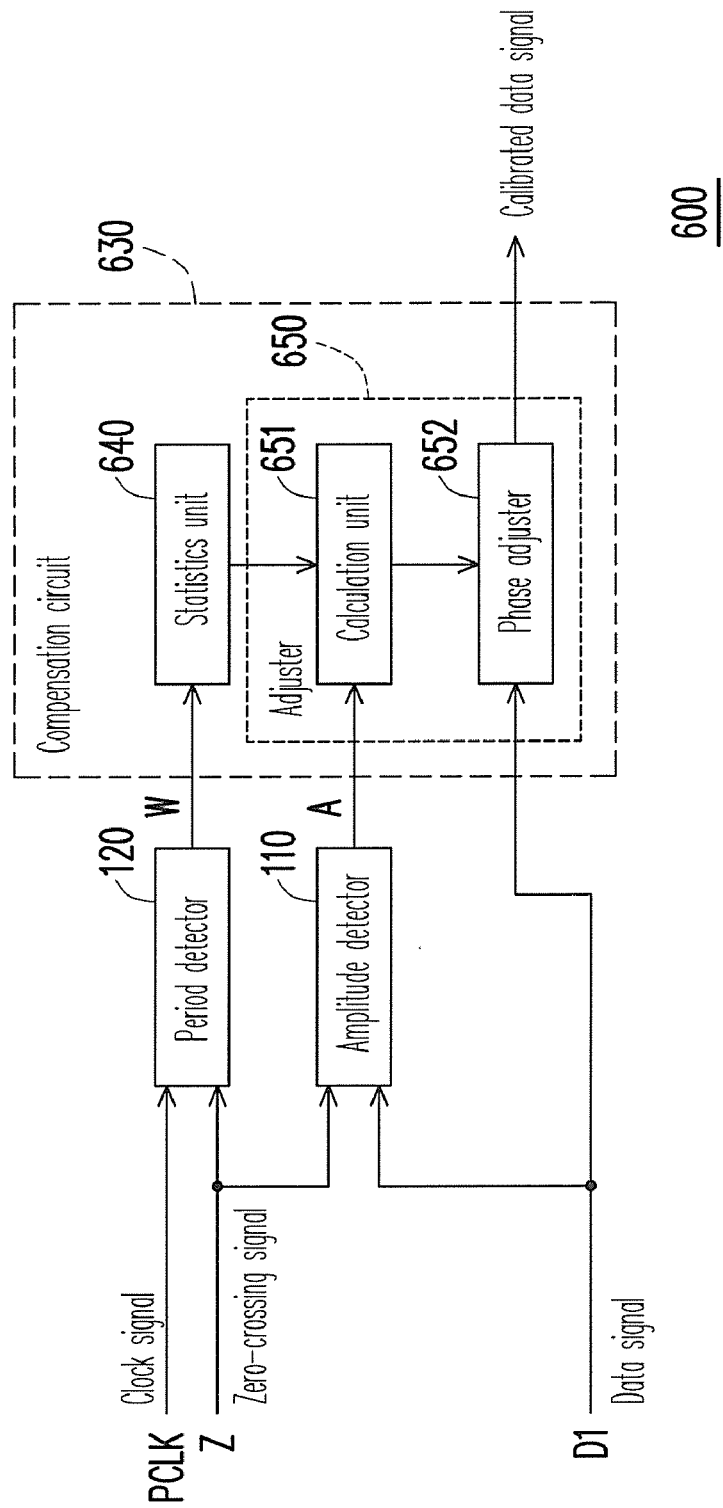
FIG. 6 is a block diagram of a calibration circuit for data recovery according to a third embodiment of the present invention.

FIG. 6 is a block diagram of a calibration circuit 600 for data recovery according to a third embodiment of the present invention. Please refer to both FIGS. 3 and 6. The major difference between the second embodiment and the third embodiment lies in the compensation circuit 630.

In the third embodiment, the period detector 120 is coupled to the statistics unit 640, and the amplitude detector 110 is coupled to the adjuster 650.

Specifically, based on the predetermined reference signal, the statistics unit 640 selects/interpolates an amplitude reference value $A_k'$ corresponding to the period signal $W_k$ and outputs the amplitude reference value $A_k'$ to the calculation unit 651. The calculation unit 651 receives the amplitude reference value $A_k'$ and the amplitude signal $A_k$ that is generated and output by the amplitude detector 120 and calculates the difference value between the amplitude signal $A_k$ and the amplitude reference value $A_k'$. The calculation unit 651 then multiplies the difference value by a predetermined multiplier to generate a second compensation parameter C2. Next, the calculation unit 651 outputs the second compensation parameter C2 to the phase adjuster 652. To adjust the phase of the data signal D1, the phase adjuster 652 adjusts the starting time and the ending time of the period signal $W_k$ according to the second compensation parameter C2 to generate a calibrated data signal.

Figure 7:
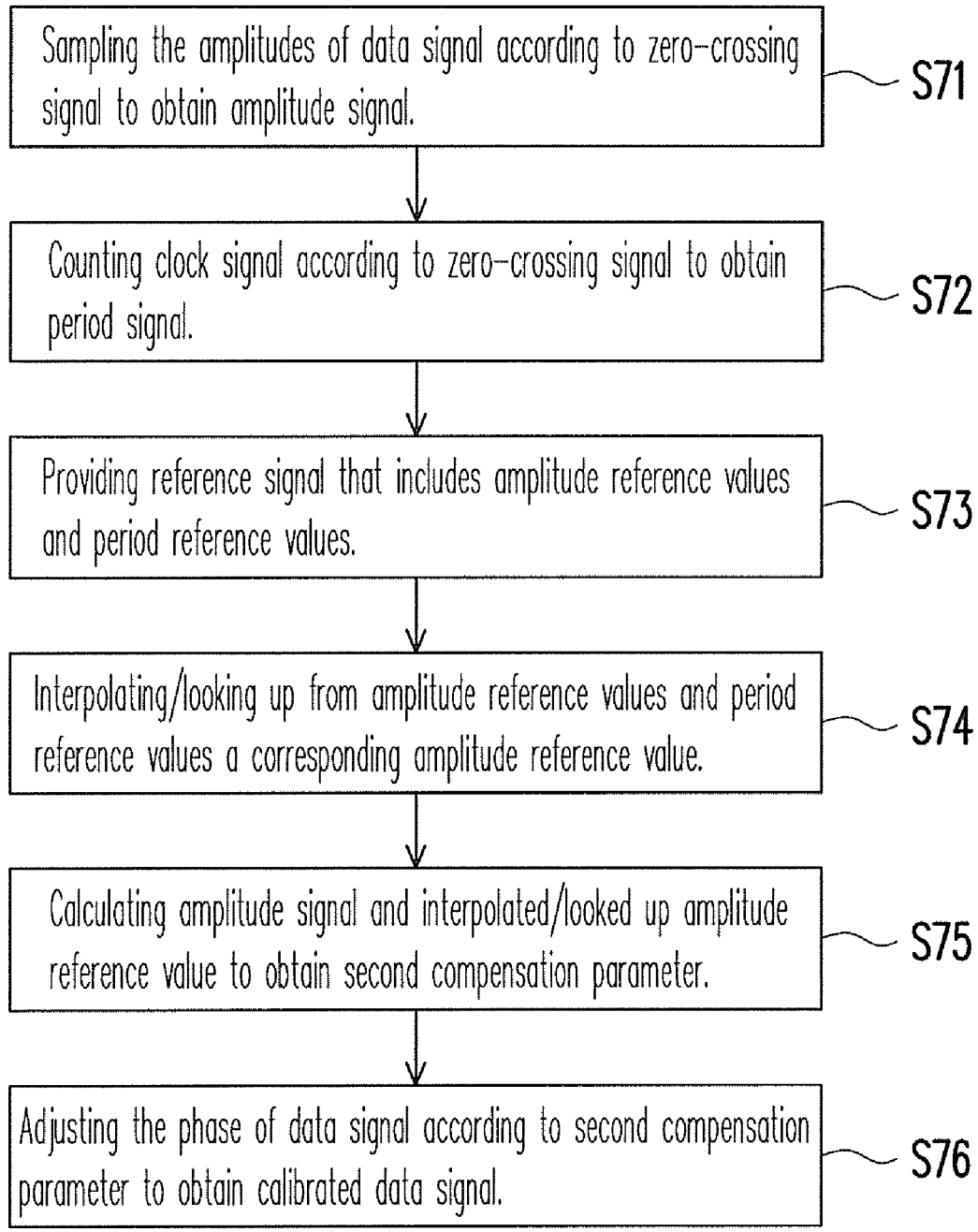
FIG. 7 is a flow chart of a calibration method for data recovery according to the third embodiment of the present invention.

FIG. 7 is a flow chart of a calibration method for data recovery according to the third embodiment of the present invention. In step S71, the amplitude detector 110 receives the data signal D1 and the zero-crossing signal Z, samples the amplitudes of the data signal D1 according to the zero-crossing signal Z, and outputs the amplitude signal $A_k$. In step S72, the period detector 120 receives the zero-crossing signal Z and the clock signal PCLK, samples the clock signal PCLK according to the zero-crossing signal Z, and outputs the period signal $W_k$. In step S73, the statistics unit 640 provides the reference signal that includes a plurality of amplitude reference values and a plurality of period reference values. In step S74, the statistics unit 640 selects/interpolates the amplitude reference value $A_k'$ corresponding to the period signal $W_k$ and then outputs the amplitude reference value $A_k'$ to the calculation unit 651. In step S75, the calculation unit 651 receives the amplitude signal $A_k$ and the amplitude reference value $A_k'$, calculates the difference value between the amplitude signal $A_k$ and the amplitude reference value $A_k'$, and multiplies the difference value by a predetermined multiplier to generate a second compensation parameter C2. In step S76, to adjust the phase of the data signal D1, the phase adjuster 652 adjusts the starting time and ending time of the period signal $W_k$ according to the second compensation parameter C2 to generate the calibrated data signal.

Figure 8:
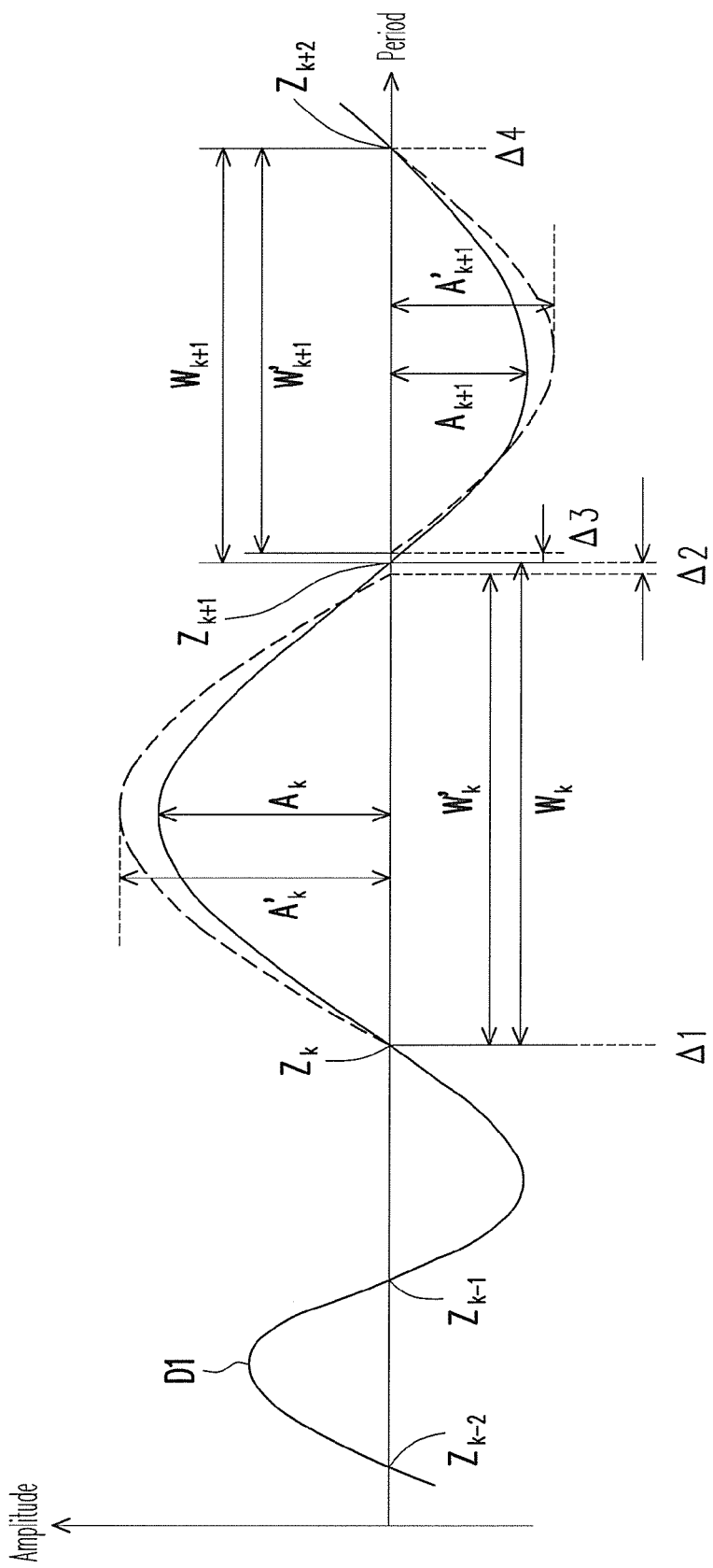
FIG. 8 is a waveform diagram of the calibration method according to the third embodiment of the present invention.

Simply speaking, if the period is fixed and the amplitude reference value is larger than the measured amplitude, it means that the measured amplitude is relatively small, and the period of the data signal D1 can then be shortened in the present embodiment. FIG. 8 is a waveform diagram of the calibration method according to the third embodiment of the present invention. Please refer to both FIGS. 6 and 8. The period detector 120 samples the period $W_k$ of the $k^{th}$ segment of the data signal D1 and outputs the period $W_k$ to the statistics unit 640. Based on the predetermined reference signal, the statistics unit 640 selects/interpolates an amplitude reference value $A_k'$ corresponding to the period signal $W_k$ and outputs the amplitude reference value $A_k'$ to the calculation unit 651. The amplitude detector 110 receives the data signal D1 and the zero-crossing signal Z, samples the maximum amplitude $A_k$ of the $k^{th}$ segment of the data signal D1, and outputs the maximum amplitude $A_k$ to the calculation unit 651.

The calculation unit 651 receives the amplitude reference value $A_k'$ and the maximum amplitude $A_k$ of the $k^{th}$ segment of the data signal D1 and calculates the difference between the amplitude signal $A_k$ and the amplitude reference value $A_k'$ according to the following equation (2) to generate the second compensation parameter C2:

$$C2 = K_2 * (A_k - A_k') \quad (2)$$

where $K_2$ is a weighting factor. Next, in the embodiment, the phase of the $k^{th}$ segment of the data signal D1 is adjusted according to the second compensation parameter C2. Through adjusting the period signal of each segment of the data signal D1, the reliability of the data signal D1 is improved according to the present embodiment.

Fourth Embodiment

Figure 9:
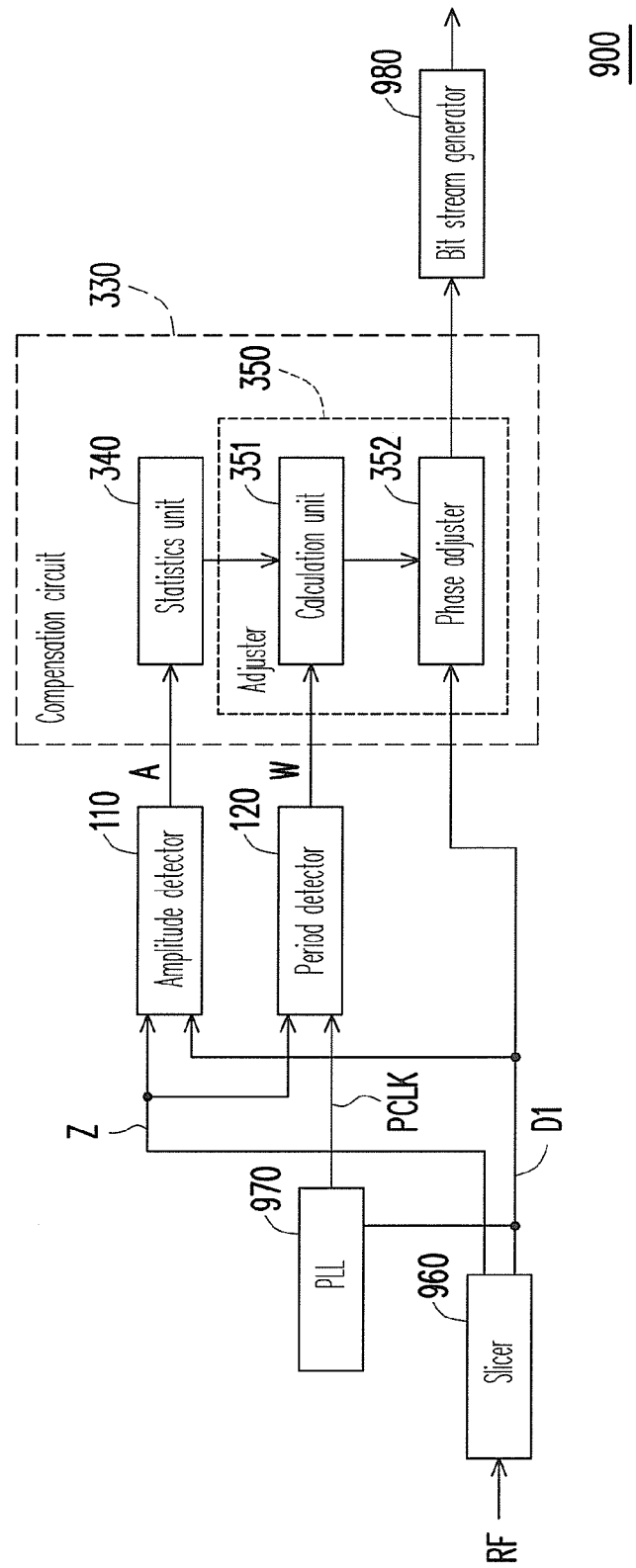
FIG. 9 is a block diagram of a calibration circuit for data recovery according to a fourth embodiment of the present invention.

FIG. 9 is a block diagram of a calibration circuit for data recovery according to a fourth embodiment of the present invention. Please refer to both FIGS. 3 and 9. The major difference between the fourth embodiment and the second embodiment lies in the slicer 960, the phase lock loop (PLL) 970, and the bit stream generator 980 as shown in FIG. 9.

In addition to the functional units also appearing in FIG. 3, the calibration circuit 900 for data recovery further includes a slicer 960, a PLL 970, and a bit stream generator 980. The slicer 960 is coupled to the PLL 970, the amplitude detector 110, and the compensation circuit 330. The PLL 970 is coupled to the slicer 960 and the period detector 120. The bit stream generator 980 is coupled to the compensation circuit 330.

Specifically, the slicer 960 receives the RF signal RF and the slicing level, slices the RF signal RF according to the slicing level, outputs the generated data signal D1 to the PLL 970, the amplitude detector 110, and the compensation circuit 330, and outputs the zero-crossing signal Z to the amplitude detector 110 and the period detector 120. The RF signal RF is provided by the optical read/write head of an optical storage system, for example. The PLL 970 receives the data signal D1 and outputs a clock signal PCLK to the period detector 120 according to the phase of the data signal D1. The bit stream generator 980 receives the calibrated data signal from the compensation circuit 330, converts the calibrated data signal into a bit stream, and outputs the bit stream.

Figure 10:
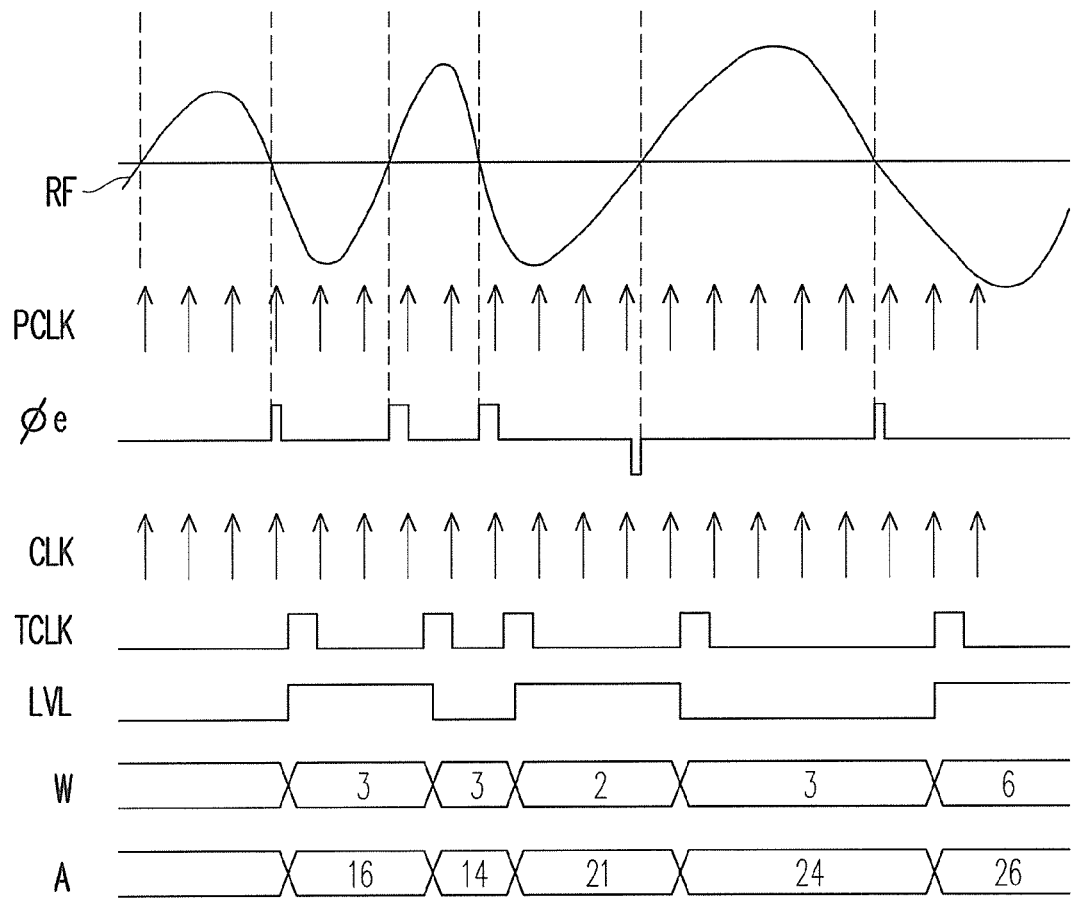
FIG. 10 is a waveform diagram of a calibration method according to the fourth embodiment of the present invention.

For example, FIG. 10 is a waveform diagram of the calibration method according to the fourth embodiment of the present invention. The slicer 960 receives the RF signal RF and the slicing level and slices the RF signal RF according to the slicing level. Here, the sliced RF signal is the aforementioned data signal D1. The PLL 970 receives the phase of the data signal D1 and outputs the clock signal PCLK to the period detector 120. In FIG. 10, $\phi_e$ represents the phase difference between the clock signal PCLK and the zero-crossing points of the RF signal RF. A positive $\phi_e$ indicates that the zero-crossing points of the RF signal RF lead the clock signal PCLK. A negative $\phi_e$ indicates that the zero-crossing points of the RF signal RF lag the clock signal PCLK. For example, $\phi_e$ is, but is not limited to, the smaller absolute phase error between the zero-crossing points of the RF signal RF and two adjacent clock signals PCLK. The timing point (or clock point) of the smaller absolute phase error is also the period alignment point of the bit signal. In FIG. 10, CLK represents the system clock; LVL represents the RF level, either high or low, before zero-crossing; TCLK represents a zero-crossing signal; the period signal W represents the RF period, e.g. 2T or 3T, before zero-crossing; the amplitude signal A represents the RF amplitude before zero-crossing.

Furthermore, the amplitude detector 110 samples a maximum amplitude $A_k$ of a segment of the data signal D1, outputs the amplitude signal $A_k$ to the statistics unit 340 to generate a corresponding period reference value $W_k'$, and outputs the period reference value $W_k'$ to the calculation unit 351. The period detector 120 samples a period signal $W_k$ of a segment of the data signal D1 and outputs the period signal $W_k$ to the calculation unit 351. The calculation unit 351 receives the period signal $W_k$ and the period reference value $W_k'$, calculates the difference value between the period signal $W_k$ and the period reference value $W_k'$, and multiplies the difference value by the predetermined multiplier to generate the first compensation parameter C1. To adjust the phase of the data signal D1, the phase adjuster 352 adjusts the starting time and the ending time of the period signal $W_k$ according to the first compensation parameter C1. The phase adjuster 352 then outputs the calibrated data signal. Finally, the bit stream generator 980 converts the calibrated data signal into a bit stream and outputs the bit stream. A circuit can process the bit stream in a subsequent process. When the circuit subsequently processes the calibrated data signal directly, the calibration circuit 900 can leave out the bit stream generator 980.

As illustrated, the present invention compares the amplitude and the period with the amplitude and the period of the reference signal so as to adjust the data signal through adjusting the phase of the data signal between the adjacent zero-crossing points. Since the calibrated data signal has a compensated phase, it has diminished distortion. The reliability and the recognition rate of the data signal are therefore enhanced. In addition, since the present invention can adjust the data signal in real-time, phase distortion and amplitude distortion of the data signal caused by noise can be decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A calibration circuit for data recovery, the calibration circuit comprising:
   an amplitude detector, for receiving a data signal and a zero-crossing signal, sampling a plurality of amplitudes of the data signal according to the zero-crossing signal, and outputting an amplitude signal, wherein the amplitude signal represents an amplitude value;

a period detector, for receiving the zero-crossing signal and a clock signal, counting the clock signal according to the zero-crossing signal, and outputting a period signal; and a compensation circuit, coupled to the amplitude detector and the period detector, for receiving the amplitude signal, the period signal, and the data signal, adjusting a phase of the data signal through calculating differences between a reference signal and the amplitude signal and the period signal, and outputting a calibrated data signal, wherein the compensation circuit comprises a statistics unit coupled to the amplitude detector, and the statistics unit receives the amplitude signal from the amplitude detector, predetermines the reference signal comprising a plurality of amplitude reference values and a plurality of period reference values, and utilizes the amplitude reference values to interpolate a period reference value corresponding to the amplitude signal from the period reference values.

2. The calibration circuit of claim 1, wherein the compensation circuit further comprises:

an adjuster, coupled to the statistics unit and the period detector, receiving the period signal from the period detector and the interpolated period reference value to generate a first compensation parameter, adjusting the phase of the data signal according to the first compensation parameter, and outputting the calibrated data signal.

3. The calibration circuit of claim 2, wherein the adjuster comprises:

a calculation unit, coupled to the statistics unit and the period detector, for receiving the period signal and the interpolated period reference value, calculating a difference value between the period signal and the interpolated period reference value, and multiplying the difference value by a predetermined multiplier to generate the first compensation parameter; and a phase adjuster, coupled to the calculation unit, for adjusting the phase of the data signal to generate the calibrated data signal through adjusting a starting time and an ending time of the period signal according to the first compensation parameter.

4. The calibration circuit of claim 1, further comprising:

a slicer, for receiving a RF signal and a slicing level, slicing the RF signal according to the slicing level, and outputting the data signal and the zero-crossing signal accordingly; and a phase lock loop, coupled to the slicer, for receiving the data signal and outputting the clock signal accordingly.

5. The calibration circuit of claim 1, further comprising:

a bit stream generator, coupled to the compensation circuit, for receiving the calibrated data signal, converting the calibrated data signal into a bit stream, and outputting the bit stream.

6. A calibration method for data recovery, the calibration method comprising:

a. sampling amplitudes of a data signal according to a zero-crossing signal to generate an amplitude signal, wherein the amplitude signal represents an amplitude value;

b. counting a clock signal according to the zero-crossing signal to generate a period signal; and c. adjusting a phase of the data signal to generate a calibrated data signal through calculating differences between a reference signal and the amplitude signal and the period signal, wherein the step c comprises:

d. providing the reference signal comprising a plurality of amplitude reference values and a plurality of period reference values;

e. interpolating a period reference value of the period reference values corresponding to the amplitude signal from the amplitude reference values or looking up a period reference value of the period reference values corresponding to the amplitude signal from the amplitude reference values, wherein a relationship between the amplitude reference values and the period reference values is represented by a look-up table.

7. The calibration method of claim 6, wherein step c further comprises:

f. calculating the period signal and the period reference value obtained in step e to generate a first compensation parameter; and g. adjusting the phase of the data signal according to the first compensation parameter to obtain the calibrated data signal.

8. The calibration method of claim 7, wherein step f comprises:

calculating a difference value between the period signal and the period reference value obtained in step e; and multiplying the difference value by a predetermined multiplier to generate the first compensation parameter.

9. The calibration method of claim 7, wherein step g comprises:

adjusting the phase of the data signal to obtain the calibrated data signal through adjusting a starting time and an ending time of the period signal according to the first compensation parameter.

10. The calibration method of claim 6, further comprising:

slicing a RF signal according to a slicing level to obtain the data signal and the zero-crossing signal; and generating the clock signal according to the phase of the data signal.

11. The calibration method of claim 6, further comprising:

converting the calibrated data signal into a bit stream.

* * * * *